United States Patent [19]

Takata

[11] Patent Number: 4,515,311
[45] Date of Patent: May 7, 1985

[54] LIQUID WASTE APPLICATION SYSTEM WITH SLUDGE GUN

[75] Inventor: Harry H. Takata, Edina, Minn.

[73] Assignee: Ag-Chem Equipment Co., Inc., Minneapolis, Minn.

[21] Appl. No.: 492,475

[22] Filed: May 6, 1983

[51] Int. Cl.³ ............................................. A01G 25/09
[52] U.S. Cl. .................................................. 239/172
[58] Field of Search ............... 239/148, 172, 176, 373, 239/662; 222/255, 263; 137/566; 417/199 R, 205; 169/24

[56] References Cited

U.S. PATENT DOCUMENTS

| | | | |
|---|---|---|---|
| 2,698,664 | 1/1955 | Freeman | 169/25 |
| 2,809,596 | 10/1957 | Sullwold et al. | 417/205 |
| 2,818,682 | 1/1958 | Finn | 239/565 X |
| 2,975,978 | 3/1961 | Probst | 239/172 |
| 3,228,144 | 1/1966 | Homan | 239/159 X |
| 3,339,846 | 9/1967 | Guetet | 239/304 |
| 3,401,890 | 9/1968 | Middlesworth | 239/670 |
| 3,490,695 | 1/1970 | Rittenhouse | 239/77 |
| 3,605,908 | 9/1971 | McDonald et al. | 239/77 X |
| 3,655,130 | 4/1972 | Patrick | 239/77 |
| 3,670,963 | 6/1972 | Stroebel et al. | 239/77 |
| 3,717,285 | 2/1973 | Hatton | 239/662 X |
| 3,840,074 | 10/1974 | Clark | 169/24 |
| 4,037,664 | 6/1977 | Gibson | 169/24 X |
| 4,089,621 | 5/1978 | Brown | 417/199 R |
| 4,108,380 | 8/1978 | Richardson | 239/172 |
| 4,168,801 | 9/1979 | Kuck et al. | 239/172 |
| 4,186,885 | 2/1980 | Christian | 239/654 |
| 4,232,616 | 11/1980 | van der Lely | 239/172 |

Primary Examiner—Andres Kashnikow
Assistant Examiner—James R. Moon, Jr.
Attorney, Agent, or Firm—Orrin M. Haugen; Thomas J. Nikolai; Douglas L. Tschida

[57] ABSTRACT

A vacuum/pressure liquid waste application system for vacuum loading a distribution tank with liquid waste treatment materials and distributing the liquid matter via a pressurized tank and flow-forming and directing sludge gun. Clog-free directional surface application is thereby achieved over relatively rugged or inaccessible terrain.

8 Claims, 3 Drawing Figures

LIQUID WASTE APPLICATION SYSTEM WITH SLUDGE GUN

BACKGROUND OF THE INVENTION

The present invention relates to liquid waste distribution systems and in particular to a surface application system employing a centrifugal pump, a sludge gun and a vacuum/pressure distribution tank. The liquid treatment materials may be loaded via a vacuum action and are distributed via the pressurizing of the tank as the centrifugal pump pumps the materials to the sludge gun.

Liquid waste distribution systems have heretofore been employed for applying liquid-manure or the like in various surface and sub-surface application systems. Typically in such systems, the liquid matter is pumped into a distribution tank from a holding tank, nurse truck or lagoon and then conveyed to the field and surface applied via gravity flow or a pumped operation, most typically employing an impeller pump. Alternatively, subsurface application has also been achieved via equipment such as the present Assignee's Ag-Gator ®2004 and 3004; Terra-Gator ®2505; and Terra-Truck ®1604 systems, among others.

For more information with respect to systems of the former type, however, attention is directed to U.S. Pat. Nos. 2,818,682; 3,339,846; 3,401,890; 3,490,695; 3,670,963; 3,717,285; and 4,186,885. These references generally contemplate the use of a hydraulic pump (typically of an impeller type) or the mixing of the liquid treatment materials at a spreader or nozzle at which a pressurized medium such as water or air is applied and by which the treatment materials are conveyed. The motive distribution power for the applied materials is thus obtained via the hydraulic pump or the carrier air or water stream with which the treatment materials are mixed.

The present invention, on the other hand, contemplates, in part, a vacuum/pressure system such as employed in the above referenced 2004, 3004, 2505 and 1604 distribution systems. In particular, the present system contemplates the use of a distribution tank that is loaded by operating a vacuum/pressure air pump in its vacuum mode so as to draw the liquid treatment materials from a storage reservoir and which distributes the liquid waste in close proximity to the vehicle by operating the vacuum/pressure pump only in its pressure mode, or for long distance surface distribution by operating the vacuum/pressure pump so as to super-charge or pressurize the distribution tank while pumping the materials from the tank via a submerged centrifugal pump and a tank mounted directional sludge gun. In this fashion, pump cavitation and consequential pump damage are avoided, while high flow rates and spread ranges of up to 150 feet are achieved for liquid treatment materials of up to 18% solids. Thus, it is possible to dispense the liquid in a relatively clog-free fashion at high flow rates and over large surface areas. Such an assembly is especially advantageous in that operating costs, such as gas consumption, are reduced and coverage can be achieved to otherwise inaccessible areas without having to physically drive thereover.

The present invention, therefore, contemplates a self-propelled chassis mounted distribution tank having an associated vacuum/pressure pump for loading liquid waste materials in a vacuum mode and evacuating the tank by operating the pump in a pressure mode. An associated "sludge gun" and submerged centrifugal pump are coupled to the distribution tank for controllably directing the release of the liquid waste at a desired higher pressure, in a desired stream type and in a highly directional fashion. These various objects, advantages and distinctions of the present invention, as well as various others will, however, become more apparent upon a reading of the following description with respect to the following drawings. It is to be appreciated though that while the present invention is described with respect to its presently preferred embodiment, various modifications or changes may be made thereto by those of skill in the art without departing from the scope of the present invention.

SUMMARY OF THE INVENTION

Liquid waste distribution apparatus comprising a mobile distribution tank having an associated vacuum/pressure pump, submerged centrifugal pump and top-mounted sludge gun assembly, whereby the liquid waste is loaded via the operation of the vacuum/pressure air pump in a vacuum mode and the waste is distributed via the sludge gun and the operation of the vacuum/pressure air pump in a pressure mode at the same time that the centrifugal pump pumps the pressurized material to the sludge gun. The sludge gun is hydraulically controlled for three-dimensionally rotating the nozzle so as to direct the spray. Spray shape and particulate size limit are determined by the nozzle size and pump pressure and flow developed.

DESCRIPTION OF THE PREFERRED EMBODIMENT

Figure 1:
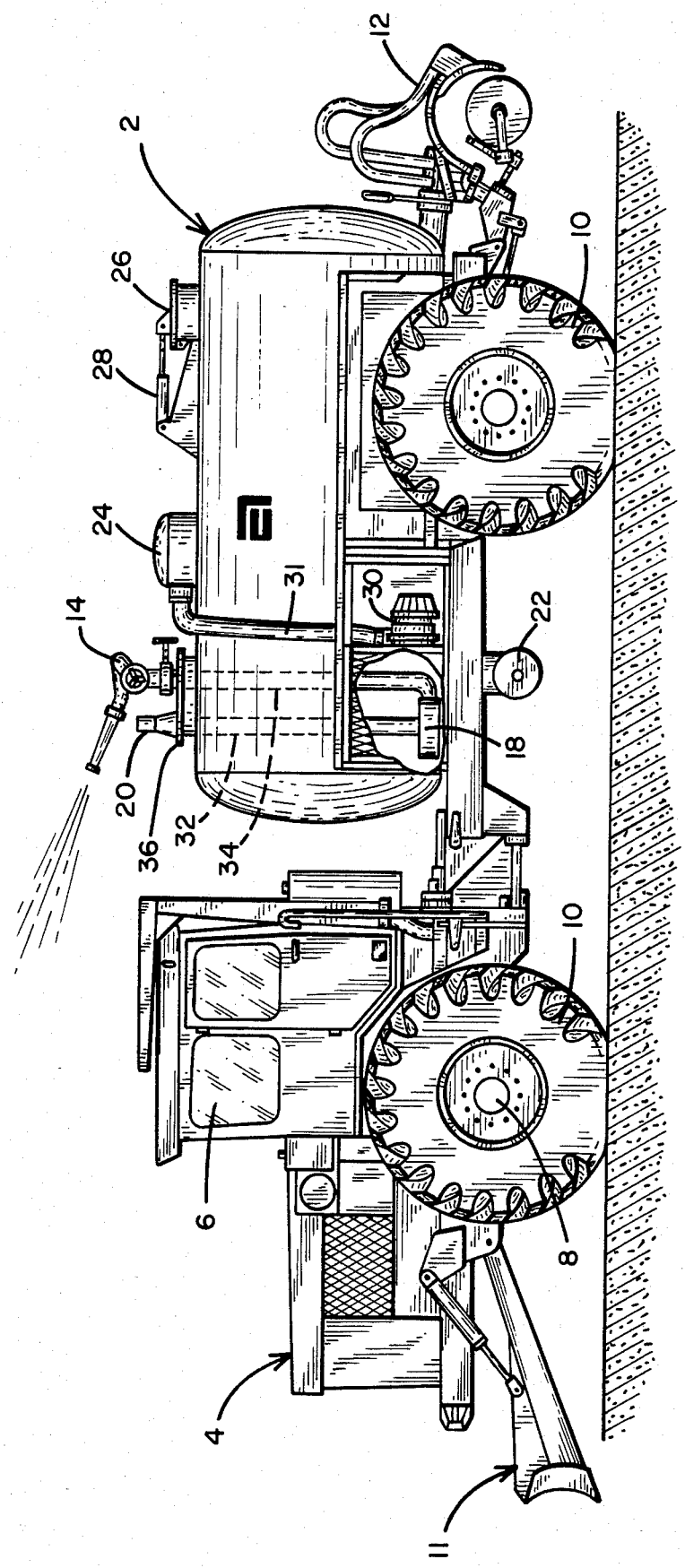
FIG. 1 shows a perspective view of the present distribution apparatus and the relative positioning of its primary elements.

Referring to FIG. 1, a perspective view is shown of the present liquid waste distribution system and which generally is comprised of a chassis-mounted holding tank 2 that is permanently or trailer-mounted to a tractor-like forward power plant 4. For the present embodiment, the tractor 4 is comprised of a diesel-driven assembly supporting an operator's cab 6 above an axle 8 and a pair of heavy equipment flotation tires 10 that are mounted thereto. Mounted, in turn, to the forward end of the tractor 4 is a dozer blade that is used for light clearing of obstructions such as downed trees and the like, such as in silviculture operations.

It is to be recognized though that while a trailer-mount system is presently depicted numerous other configurations are contemplated, depending upon farm operation size and attendant equipment demands. Some of such equipment configurations can be observed upon reference to the present Assignees product literature and modular line of farm support equipment compatible with the Ag-Gator ® and Terra-Gator ® power chassis.

In any case, a trailerable distribution tank 2 is contemplated and which in the present embodiment is also supported on its own pair of driven flotation tires 10. While the tank size may vary, the present embodiment contemplates a tank of typically a 2,200 gallon capacity.

In operation, such a tank would be filled from a nurse tank, holding pond or similar storage facility whereat the liquid-solid waste treatment materials would be kept. For instance, for a dairy operation, animal manure is oftentimes washed from the milking stations into a larger underground holding tank and from which the liquid materials are pumped into the present distribution tank, before spraying onto the farm fields. Alternatively and by way of contrast, solid-waste spreaders may be employed for some farm operations, but for others the present invention contemplates a liquid waste distribution system.

Associated with the rear-most end of the distribution tank 2 is a sub-surface multi-shank injector assembly 12 that may be used in appropriate circumstances to inject the treatment materials at a desired depth in specially created furrows so as to thereby bury the liquid material to avoid odor or to reduce evaporative loss of the nutrient components, especially nitrogen. Most typically, such an assembly is used where the terrain and ground conditions permit the conveying of the tank 2 and subsurface incorporation assembly 12 directly over the area to be treated and wherein the motive power to discharge the liquid is provided by the pressurization of the air above the liquid in the tank. However, where terrain or soil conditions do not permit subsurface application, the present apparatus includes a high-pressure pump system and top-mounted sludge gun 14 for spraying the treatment materials long distances to otherwise inaccessible areas, such as in a forest, in a surface application fashion. Specifically, such application is achieved via a vacuum/pressure air pump that pressurizes the tank 2 in a supercharged fashion while a submerged centrifugal pump 18 pumps the materials out and through the sludge gun 14. An associated hydraulic drive assembly 20 powers the centrifugal pump 18, while a related hydraulic drive assembly (shown in FIG. 2) three-dimensionally controls the spray direction of the sludge gun 14. The tank 2, in turn, may be loaded in a variety of ways via the reload port 22 or the hydraulically actuated and controlled hatch 26. Hatch 24, on the other hand, is a pressure sealed manway.

As mentioned, the tank 2 may be filled via the hatch 26 or via the reload port 22. Depending upon the type of farm operation, one or the other of these mechanisms may be advantageously employed. Where an overhead pump station is available, the hatch 26 facilitates top filling. Otherwise, where the tank 2 is filled from a resevoir, lagoon or nurse truck, the tank is more readily filled via the reload port 22 and the simultaneous operation of the vacuum/pressure air pump 30 in a vacuum mode. For the present embodiment, the vacuum/pressure air pump 30 is comprised of a 192 CFM pressure/vacuum air pump and which has been found to adequately handle liquid waste having a solids content of up to on the order of 18%.

Figure 2:
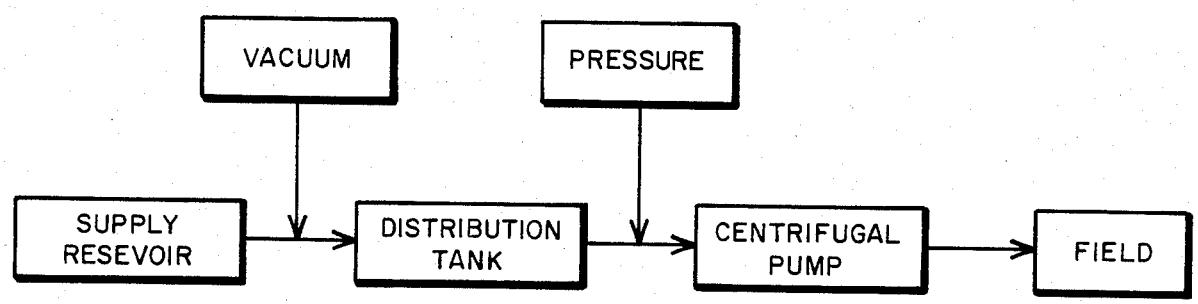
FIG. 2 shows a flow diagram of the liquid waste treatment material through the present equipment.

Referring next to FIG. 2, a generalized block diagram is shown of the present distribution system as it relates to its associated spray operation via the sludge gun 14. Generally and as mentioned, such operation requires the vacuum filling of the distribution tank 2 from a supply resevoir. Upon reaching the desired distribution site, the vacuum/pressure pump 30 is switched to its pressure mode of operation so as to pressurize the tank 2 via the conduit 31 coupled to the tank hatch 24. The submerged centrifugal pump 18 is driven via the hydraulic motor 20 and the mechanical shaft linkage (not shown) contained in conduit 32 so as to pump the materials from the tank 2 via conduit 34 at pressures up to 90 psi and spray them in a highly directional fashion at ranges of up to 150 feet while the tank 2 is pressurized by the air pump 30 in its pressure mode to approximately 10 psi. Thus, the present system is able to spread sludge into a forested arear from logging trails accesible to the vehicle.

Before continuing, it is to be noted that when used in conjunction with the subsurface distribution assembly 12 the vacuum/pressure pump 30 is operated alone to pressurize the air in the tank 2 to force the treatment materials to the injectors. For this type of soil application, the low pressure is sufficient to accommodate the distance over which the treatment materials must be conveyed. However, the pump 30 is not sufficient in and of itself to pressurize the tank to a pressure adequate enough to convey the materials the desired 100 or so feet. On the other hand, though, the pump 30 is of a sufficient size so as to super-charge the tank 2 to a pressure on the order of 10 PSI and thereby facilitate the removal of the treatment materials via the centrifugal pump 18 and which provides the necessary relatively high pressure. In particular, because the treatment materials are under pressure as they enter the centrifugal pump 18, they are easily removed by the pump 18 without pump cavitation and which would otherwise occur since the viscous waste materials by their inherent nature would otherwise resist flow into the centrifugal pump 18 (whether submerged or externally located). It is also to be noted that the centrifugal pump 18 is mounted slightly above the bottom of the tank 2 and which thereby permits a substantially complete pump down. As mentioned, too, the drive power to the pump 18 is supplied via the hydraulic supply lines (not shown) and the hydraulic motor that is connected to the drive shaft contained in casing 32, while the pumped materials are supplied to the sludge gun 14 via the conduit 34 and which is typically sized to be on the order of three inches in diameter.

The sludge gun 14 and pump assembly, in turn, is mounted to the tank 2's cover plate 36 so as to be removable as an integral assembly. The gun 14 is also rotatable over 240°, and the various controls for achieving such rotation and elevational changes will be discussed hereinafter with respect to FIG. 3. It is to be noted, too, that the sludge gun 14 that is employed in the present embodiment is of a type manufactured by Stang Corporation and which are often encountered in various fire fighting apparatus, mining and construction equipment. Therefore, the specific details relative to the internal operation and mechanisms of the sludge gun 14 will not be discussed in detail, but rather the reader is directed to the various related product literature of the Stang Corporation.

Figure 3:
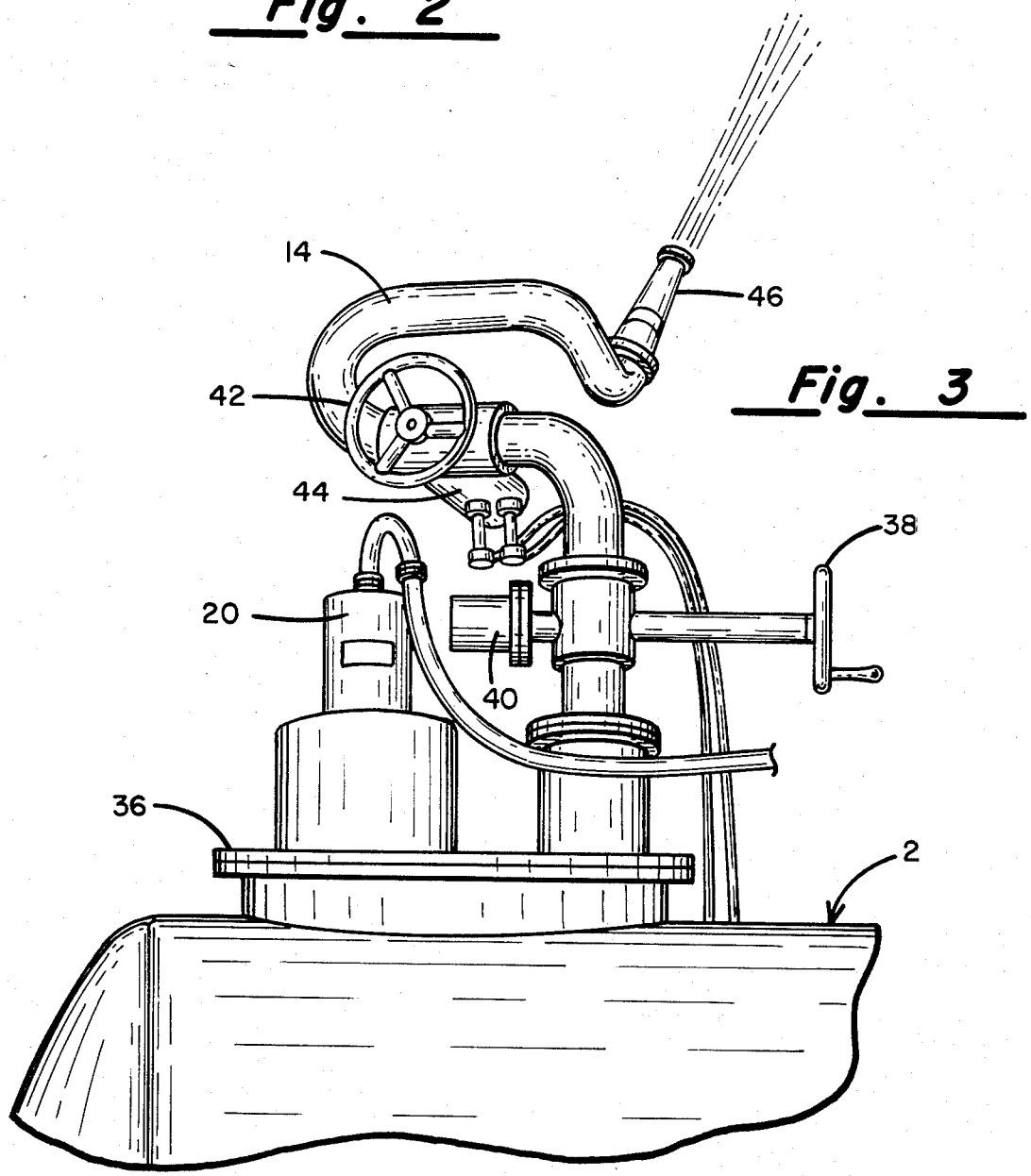
FIG. 3 shows a detailed perspective view of the present sludge gun.

Referring next to FIG. 3, a detailed perspective view is shown of the tank 2's cover plate 36 and associated hydraulic drive assembly 20 and sludge gun 14, as well as its associated directional drive controls. From FIG. 3, it is to be noted that the sludge gun 14 is directionally operable either manually or automatically via the rotational hand screw 38, rotational hydraulic drive 40, elevational hand screw 42, and/or elevational hydraulic drive 44. If operated manually, the hand screws 38 and 42 are used to control internal screw drive assemblies (not shown) and which, in turn, direct the nozzle 46. Alternatively and more preferably, such directional control is achieved via the hydraulic drive lines that are coupled to the hydraulic drive assemblies 40 and 44 and which are operative from the cab 6 by the operator. Thus, it is not necessary for the operator to leave the cab 6 during treatment application. Similarly, the hydraulic drive power is supplied to the submerged pump 18 via the cab-controlled hydraulic motor assembly 20 and which, as mentioned, is actuated, upon the tank 2 being properly pressurized.

From the foregoing, it should be apparent that the present invention offers an improved assembly whereby liquid treatment materials of relatively high solids content may more advantageously be surface applied. It should also be apparent that while the present invention has been described with respect to its preferred embodiment, various modifications or changes might be made thereto without departing from the spirit of the invention. It is, therefore, contemplated that the following claims will be interpreted to include all equivalent embodiments within the scope thereof.

What is claimed is:

1. Apparatus for surface applying a relatively viscous liquid at long distances, comprising in combination:
   a. a mobile distribution tank for containing a quantity of a relatively viscous liquid;
   b. means operative during a discharge mode for maintaining a positively pressurized condition in said tank;
   c. means operative during the discharge mode for pumping said viscous liquid from said tank at flow rates of several hundreds of gallons per minute and during which said pressurization means sufficiently pressurizes said tank to prevent pump cavitation; and
   d. turret mounted nozzle means receiving the pumped liquid for controllably and directionally surface applying the liquid at distances in excess of one hundred feet from said tank.

2. Apparatus as set forth in claim 1 including an inlet port and means operative during a loading mode for negatively pressurizing said tank so as to vacuum load said tank from a larger storage resevoir.

3. Apparatus as set forth in claim 1 wherein said means for positively and negatively pressurizing said tank comprises an air pump coupled to pump air from said tank during a loading mode and to pump air into said tank during a discharge mode.

4. Apparatus as set forth in claim 1 wherein said turret mounted nozzle means includes hydraulic means for rotatively and elevationally adjusting the distribution angle of a liquid discharge nozzle.

5. Apparatus as set forth in claim 1 wherein said pump means comprises a substantially submerged, hydraulically driven centrifugal pump.

6. Distribution apparatus for surface applying relatively viscous liquid soil treatment materials comprising in combination:
   a. a mobile distribution tank for containing a quantity of soil treatment materials, including in excess of 10% solids, under positive and negative pressure conditions;
   b. means for transporting said tank over a variety of ground conditions and terrains;
   c. air pump means selectively operable during a loading mode for vacuum loading said tank and for alternatively pressurizing said tank, during a distribution mode;
   d. an inlet port coupled to said tank for receiving treatment materials from an external source during said loading mode;
   e. pump means operative during said distribution mode for pumping said treatment materials from said tank at flow rates of several hundreds of gallons per minute; and
   f. a turret mounted, hydraulically directionally controllable sludge gun for receiving the pumped materials and ejecting the treatment materials over distances in excess of one hundred feet during said distribution mode in a clog and cavitation free manner.

7. Apparatus as set forth in claim 6 wherein said transport means includes a hydraulically actuable dozer blade for light duty clearing of the area to be traversed.

8. Apparatus as set forth in claim 6 wherein said pump means comprises a hydraulically driven centrifugal pump.

* * * * *